United States Patent [19]

Halls et al.

[11] Patent Number: 4,894,102
[45] Date of Patent: Jan. 16, 1990

[54] METHOD FOR REFINISHING BUILDING PANELS

[75] Inventors: Kenneth F. Halls, 6972 W. 76th Ave., Arvada, Colo. 80003; Donald W. Harrison, Golden, Colo.

[73] Assignee: Kenneth F. Halls, Arvada, Colo.

[21] Appl. No.: 282,954

[22] Filed: Dec. 5, 1988

Related U.S. Application Data

[63] Continuation of Ser. No. 19,932, Feb. 27, 1987, which is a continuation-in-part of Ser. No. 707,908, Mar. 4, 1985, Pat. No. 4,666,540.

[51] Int. Cl.$^4$ ............................................. B32B 35/00
[52] U.S. Cl. ..................... 156/94; 156/212; 156/223; 156/267; 156/285; 156/286
[58] Field of Search ............... 29/402.09, 402.11; 156/94, 98, 71, 152, 247, 249, 578, 256, 104, 196, 212, 219, 221–223, 267, 272.2, 273.7, 275.7, 275.5, 285, 286, 287, 308.2, 308.6, 309.6, 309.9, 381, 382; 52/390, 514, 746; 181/291; 427/291; 428/63; 264/36; 83/925 CC, 923 CC

[56] References Cited

U.S. PATENT DOCUMENTS

| | | | |
|---|---|---|---|
| 1,505,908 | 8/1924 | Mackinnon | 427/196 |
| 2,531,128 | 11/1950 | Hobbs | 156/71 |
| 3,072,520 | 1/1963 | Groth | 156/286 |
| 3,092,203 | 6/1963 | Slayter | 156/254 |
| 3,202,561 | 8/1965 | Swanson | 156/286 |
| 3,265,547 | 8/1966 | Selbe | 156/85 |
| 3,765,289 | 10/1973 | Gerber | 83/925 CC |
| 3,811,982 | 4/1974 | Jacobsen | |
| 4,028,166 | 6/1977 | Leonhart | 156/382 |
| 4,124,421 | 11/1978 | Fujii | 156/382 |
| 4,205,835 | 6/1980 | Gerger | 83/925 CC |
| 4,305,773 | 12/1981 | Hendricks | 156/382 |
| 4,382,833 | 5/1983 | Coyle | 156/382 |
| 4,447,282 | 5/1984 | Valerio | 156/382 |
| 4,664,737 | 5/1987 | Schlosstein | 156/382 |

FOREIGN PATENT DOCUMENTS 0113865 10/1978 Japan ............................ 156/94

Primary Examiner—Merrell C. Cashion, Jr.
Attorney, Agent, or Firm—Fields, Lewis, Pittenger & Rost

[57] ABSTRACT

Disclosed are a method and apparatus of refinishing a building panel such as a acoustic ceiling panel or tile. The method includes placing the building panel to be resurfaced on a support surface having a plurality of perforations. The building panel is placed so that its back surface is in contact with the perforated support surface. The perforations extend beyond the building panel's side edges. An adhesive is applied to one side of an air impervious sheet or film. The coated sheet or film is placed over the decorative surface of the building panel and over the exposed perforations in the support surface which are located beyond the building panel's side edges. Vacuum is drawn between the sheet or film and the perforated support surface via the perforations which is sufficient to enable ambient air pressure to force or collapse the sheet tightly against the decorative surface so that the sheet substantially assumes or conforms to the contour of the building panel's decorative surface. When the adhesive dries or cures, the sheet will be tightly adhered to the decorative surface of the building panel. A preferred embodiment employs means for heating the adhesive to expedite its heating or curing. A novel, resurfaced building panel produced by the method of the present invention and an apparatus for carrying out the steps of the present invention are also disclosed.

5 Claims, 2 Drawing Sheets

METHOD FOR REFINISHING BUILDING PANELS

CROSS REFERENCE TO RELATED APPLICATIONS

This is a continuation of the application Ser. No. 019,932, now abandoned, filed Feb. 27, 1987, which is a continuation-in-part of Ser. No. 707,908, filed Mar. 4, 1985, now U.S. Pat. No. 4,666,540.

TECHNICAL FIELD

This invention relates generally to a method and apparatus for refinishing old building panels and more particularly to a low cost, on-site method and apparatus for refinishing conventional acoustical tiles and panels that have become discolored, stained or worn. Due to its low cost, the present invention is particularly amenable to refinishing large expanses of acoustical tiles and panels.

BACKGROUND ART

Removable panels and tiles have been used extensively for years, particularly in office and industrial environments. They are most commonly used in ceiling applications. However, it is not unusual to find them being used as wall coverings or partitions. The panels are typically very light due to their high porosity. Unfortunately their, lightness and the ease with which they may be removed makes them particularly vulnerable to damage, wear and discoloration, such discoloration typically resulting from water damage and/or marks caused by workmen removing the panels. Until the invention disclosed in co-pending application U.S. Ser. No. 707,908, it was standard practice to replace the damaged or discolored panels with new panels. It was difficult to wash the panels and prior to my invention it was extremely difficult to repair them without leaving noticeable evidence of the repair. Moreover, simply replacing the panels with new panels was not generally acceptable from an aesthetic standpoint since most new panels rarely match the old panels. One replacing such panels often discovers that the pattern or style of the old panels is no longer available or if it is available, one often finds that the old panels have faded too much to make a good match with a new panel possible. Accordingly, where appearance is important, it is often necessary to replace an entire area of panels, not just those which are damaged or discolored. The replacement of such, quite obviously, can be an expensive undertaking, particularly when large areas are involved.

As previously mentioned, the invention disclosed in co-pending U.S. Ser. No. 707,908, now U.S. Pat. No. 4,666,540, addresses the aforementioned problems by providing an on-site method of refinishing worn or discolored building panels. In the method, panels are first removed from their installed location. The panel is then sprayed with an adhesive and covered with a thin sheet of decorative material. Pressure is then applied to the panel, covering, and adhesive, resulting in a neat, secure bond. The refinished panel is then installed in its original location with the new covering exposed.

Other methods of covering panels prior to installation are also noted in the art. An apparatus and method for adhering a plastic covering to an acoustical panel is disclosed in U.S. Pat. No. 3,092,203 to Slayter, et al. U.S. Pat. No. 3,265,547 to Selbe discloses a method of applying, by heat, a plastic film having decorative qualities to wall panels, form board, roof planks, acoustical and decorative tile, plywood panels and ceiling board. A method of applying adhesive to a wall panel and the like prior to installation is disclosed in U.S. Pat. No. 2,531,128 to Hobbs, and in U.S. Pat. No. 1,505,908 to MacKinnon.

Methods and apparatus employing a vacuum to facilitate lamination of sheets together are also known in the art. U.S. Pat. No. 4,028,166 to Leonhart discloses a device employing a vacuum for laminating together pieces of sheet material with pressure sensitive adhesives. The sheets to be laminated together are placed on a perforated base, the perforations of which are in fluid communication with a vacuum drawing means. A framed cover of fluid impervious, substantially transparent flexible plastic sheet is lowered over the sheets having been placed on the perforated base. A vacuum then is drawn via the perforations between upper surface of the perforated base and the underside of the cover. This causes the cover to be forced downwardly by ambient air pressure on the sheets placed on the base, thereby activating the pressure sensitive adhesive which bonds the sheets.

U.S. Pat. No. 4,124,421 to Fujii discloses a method of producing a shaped wall covering material composed of a corrugated cardboard substrate, a porous buffer layer adhered to one side of the substrate and a thermal plastic resin liner coated on the outer surface of the buffer layer. The starting materials are set in a hot press in a piled arrangement with adhesive materials interposed between the layers. The arrangement is then subjected to press shaping between male and female dies with the application of heat. During the press shaping operation, air is sucked from a gap between the piled arrangement and the shaped surface of one die through holes provided in the die. This causes the piled materials to be attracted to the die through which the vacuum is being drawn thereby inhibiting layer separation which results from a tendency of the product to stick to the other die as the dies are separated from one another.

U.S. Pat. No. 4,305,773 to Hendricks discloses a painting restoration apparatus employing a vacuum to facilitate the penetration of resin and adhesive through the canvas of an old painting. This serves to prevent the old painting from cracking and enables a new canvas backing to be attached to the old painting.

U.S. Pat. No. 3,811,982 to Jacobson discloses a box-like device in which a vacuum can be drawn wherein an upper surface is pressed against a lower surface to press two elements together that are to be bonded.

U.S Pat. No. 4,382,833 to Coyle, et al. discloses a device wherein a vacuum is used in laminating a film on a solar array substrate.

While the foregoing patents disclose useful methods and apparatus for covering building panels with sheets and laminating sheets together, etc., there is still a need for methods and apparatus capable of resurfacing building panels which are low cost, simple to use, fast and capable of providing a better bond between the new surface and old building panel. It would also be desirable if there were a method and apparatus capable of resurfacing the building panel in a manner that preserves the contour or texture of the old building panel's decorative surface.

DISCLOSURE OF THE INVENTION

The present invention addresses the aforementioned problems and concerns by providing a method and apparatus for bonding an air impervious sheet or film to at least one surface of a substrate. The method includes applying an adhesive to either a side of the sheet or film or to the surface of the substrate to which the sheet is to be bonded. After applying the adhesive, the sheet or film is placed over the surfaces of the substrate to be covered by and bonded to the sheet. A partial vacuum is then drawn between the sheet or film and the surface of the substrate to be covered which is sufficient to enable ambient air pressure to force or collapse the sheet tightly against the substrate's surface so that the sheet substantially assumes the contour or texture of the substrate's surface. The sheet will be securely adhered to the substrate's surface when the adhesive dries or cures. A preferred embodiment of the present invention employs heating means for expediting curing or drying of the adhesive.

Another preferred embodiment of the present invention provides a method of resurfacing a building panel having a worn or discolored front decorative surface, a back surface and side edges. The method includes placing the building panel on a perforated support surface of a vacuum table having a plurality of perforations. The building panel is placed so that its back surface is facing and in contact with the perforated support surface. The building panel is also positioned on the perforated support surface so that it is surrounded by perforations located beyond the side edges of the building panel. The method also includes applying an adhesive to either the decorative surface of the building panel or to a side of an air impervious sheet or film. After the adhesive has been applied, the sheet or film is placed over the decorative surface of the building panel and over the exposed perforations in the support surface that are not covered by the building panel's back surface. After such placement, the adhesive will be interposed between the sheet or film and the building panel's decorative surface. A vacuum is then drawn through the perforations so that at least a partial vacuum is created between the sheet or film and the perforated support surface of the vacuum table. The vacuum is sufficient to create a vacuum across the entire decorative surface of the building panel which enables ambient air pressure to force or collapse the sheet or film tightly against the building panel's decorative surface so that the sheet substantially assumes the contour or texture of the decorative surface. When the adhesive dries or cures, the sheet will be tightly adhered to the building panel's decorative surface. A preferred embodiment of this method also employs a means for heating the adhesive so as to expedite its drying or curing.

The present invention also provides an apparatus for adhesively attaching a sheet or film to a building panel having a worn or discolored decorative front surface, a back surface and side edges. The apparatus includes a vacuum table having a top perforated support surface and a perforated underside surface with an array of perforations extending through the table from the top support surface to the bottom underside surface. The array is dimensioned to cover an area of the table's top support surface so as to extend beyond the side edges of a building panel placed on the support surface. The apparatus also includes a plenum attached to the perforated underside surface of the table which is in fluid communication with the array of perforations. The plenum is also connectable to a vacuum drawing means so that when a building panel is placed, decorative side up, on the table's top support surface and then covered with the sheet or air impervious material, the vacuum means will be capable of drawing a vacuum between the sheet and the table's perforated support surface which is sufficient to create a partial vacuum across the decorative surface of the building panel. As such, ambient air pressure will be capable of forcing or collapsing the sheet or film tightly against the decorative surface of the building panel so that the sheet substantially assumes the contour or texture of the building panel's decorative surface. A preferred embodiment of the apparatus of the present invention also includes heating means for drying or curing an adhesive having been applied to either the sheet or the building panel's decorative surface.

The present invention also provides a novel resurfaced building panel which is produced by the method of the present invention.

Additional advantages of his invention will be apparent from the description which follows, taken in conjunction with the accompanying drawings.

BEST MODE FOR CARRYING OUT THE INVENTION

Figure 1:
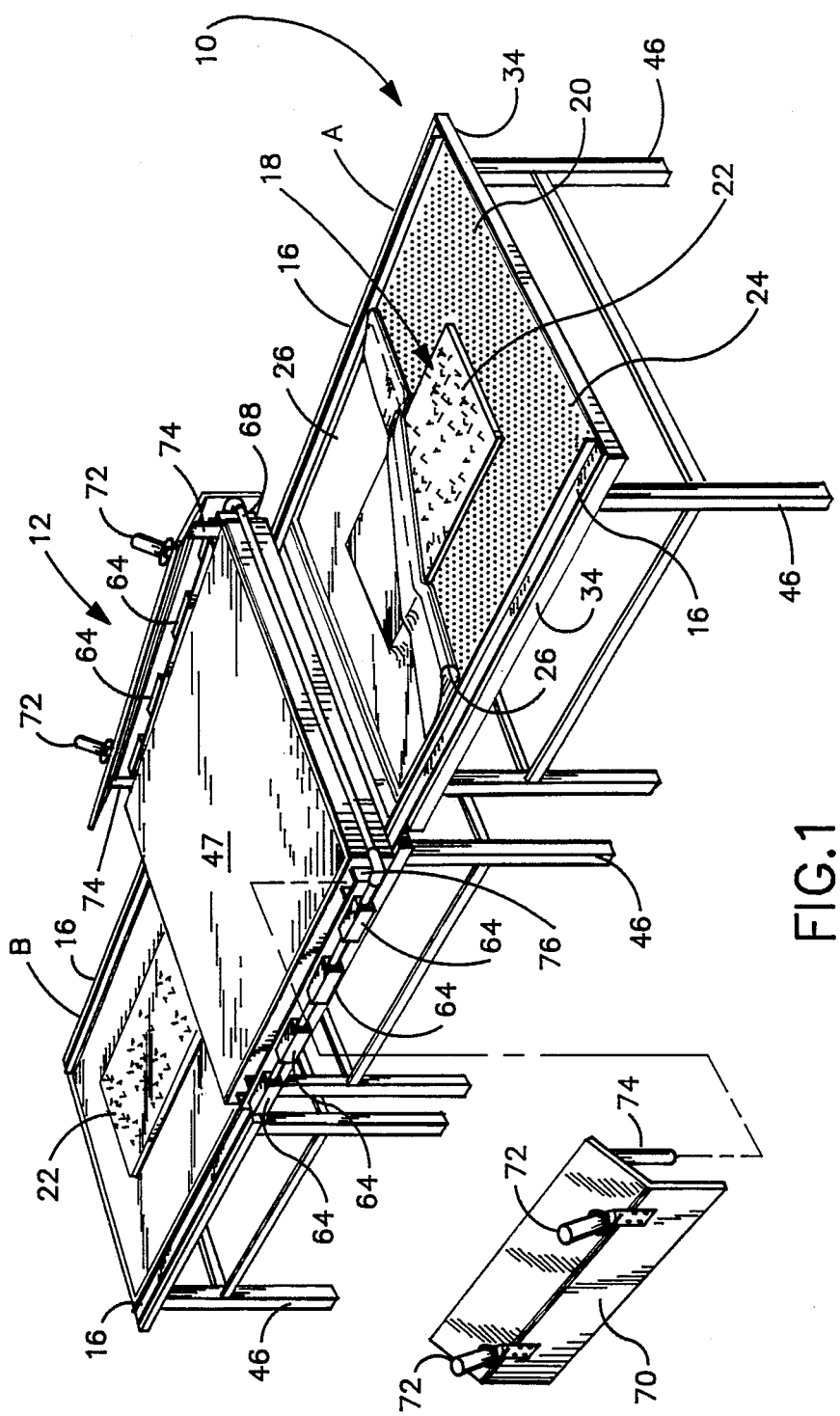
FIG. 1 is a perspective, partially exploded, view of an embodiment of the present invention having a work station at each end of a table.

FIG. 1 illustrates a vacuum table 10 of the present invention for resurfacing old building panels with a thin sheet or film of air impervious material. The table has two work stations, one at each end of the table, which are identified, respectively, as work stations A and B. Located between work stations A and B is a heating enclosure 12 mounted on wheels 14 (See FIG. 2). Wheels 14 enable the heating enclosure to be moved from work station A to work station B on tracks 16 which are mounted along opposite side edges of the table. Heating enclosure 12 and its use in accordance with the present invention will be discussed in more detail below.

Returning to FIG. 1, it can be seen that a building panel 18 requiring resurfacing has been placed on a perforated support surface 20 at work station A of vacuum table 10. A close look will also reveal that the panel's decorative textured surface 22 is facing up and that small perforations 24 exist in surface 20 which extend beyond the panel's side edges. This is perhaps better illustrated in FIG. 2.

A sheet of thin flexible air impervious material 26, which as illustrated in FIG. 1, is draped partially over building panel 18. In accordance with the method of the present invention, sheet 26 is spread out to not only cover the entire decorative surface 22 of old building panel 18 but also all perforations 24 in perforated support surface 20. This is best illustrated in FIG. 2 wherein it can be seen that sheet 26 has been placed over both the decorative surface 22 of the building panel and perforations 24 in surface 20.

Figure 2:
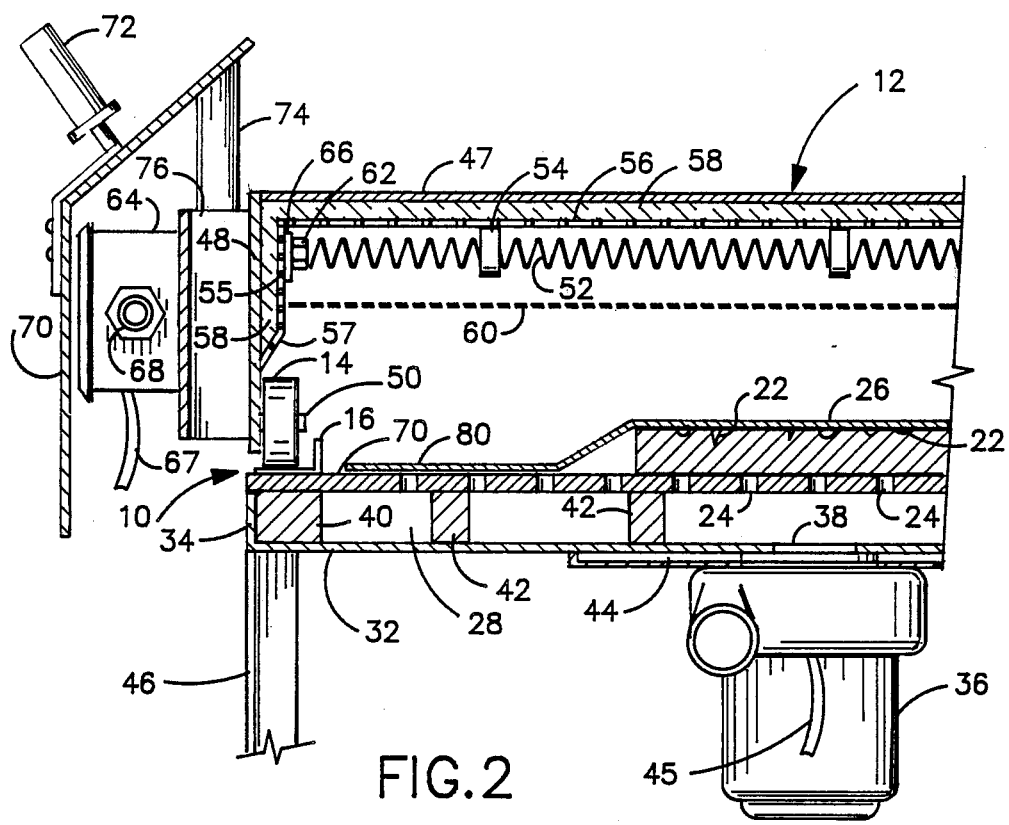
FIG. 2 is an enlarged fragmentary vertical, sectional view of the apparatus of FIG. 1 wherein the heating enclosure has been moved into position over one of the work stations.

In FIG. 2 it can also be seen that perforations 24 are in fluid communication with plenum 28. Plenum 28 has a bottom 32 and sides 34 which respectively extend beneath and along the entire underside of perforated support surface 20 of work station A to complete the plenum enclosure. This is best illustrated in FIG. 1 wherein it can be seen that sides 34 extend around the entire perimeter of work station A.

Returning to FIG. 2, it can be seen that plenum 28 is also in fluid communication with a vacuum means 36 via a hole 38 provided in bottom 32. Accordingly, those skilled in the art will appreciate that when vacuum means 36 is activated air will be sucked into plenum 28 through perforations 24 and exhausted from plenum 28 via hole 38. A vacuum means which is suitable for drawing the aforementioned vacuum is a by-pass vacuum motor which can be purchased from the Lamb Electric Division of Ameteck, Inc. of Kent, Ohio.

For optimum suction plenum 28 should be air tight except, of course, at perforations 24 and hole 38. Accordingly, the juncture where side 34 meets underside surface 30 should be air tight. An air tight seal in the embodiment of FIG. 2 is provided by gluing the edge of underside 30 to a length of framing strip 40 which extends along all sides 34 of work station A. Framing strip 40 is also preferably glued to the respective surfaces of sides 34 and bottom 32 with which it is in contact. Other means of providing such an air tight seal could also, quite obviously, be employed within the spirit of the present invention.

Also depicted in FIG. 2 are a number of spacer strips 42. The spacer strips are positioned between the perforations so as to not obstruct the flow of air through the perforations. They are also relatively short so as to not obstruct the flow of air through the plenum. Spacer strips 42 are provided to prevent the perforated support surface 20 and plenum bottom 32 from being sucked towards one another when the vacuum means is activated. A flange member 44 of vacuum means 36 is bolted to the underside of bottom 32 to secure vacuum means 36 in place. The vacuum means is supplied from an electrical supply through an electrical conduit 45. Vacuum tables legs 46 support the apparatus, but for purposes of portability are preferably not bolted or secured to bottom 32.

Turning now to heating enclosure 12, it can be seen in FIG. 2 that heating enclosure 12 comprising a top 47 from which sides 48 depend. The enclosure is mounted on wheels 14 secured to sides 48 by an axle means 50. It can also be seen, as previously mentioned, that wheels 14 are resting on track 16 which runs along side opposite side edges of the table from work station A to work station B, thereby enabling the heating enclosure to be moved from work station A to work station B and back.

Heating enclosure 12 is provided with plurality of spaced heating coils 52, preferably made from 0.050 inch diameter nickel-chrome wire which can be purchased from the Kamthal Corporation of Stamford, Conn. Each coil contains approximately 30 feet of wire which is wound to provide a coil having a 7/16 inch inside diameter. The embodiment depicted in FIGS. 1 and 2 employs four coils spaced equally apart from one another and each coil extends from one side of the enclosure to the other. Each coil is mounted or suspended within the heating enclosure from the centers of ceramic bushings 54 through which the coils extend. Bushings 54 are secured at spaced points along an internal surface of expanded metal sheet 56 which runs along the entire underside of cover 47 of top 47 of heating enclosure 12. At the side edges of sheet 56 are flanges 55 which extend generally parallel to but inwardly of sides 48. Flanges 55 have an outwardly bent depending edge 57 which is attached to sides 48 by an suitable means, such as welding. Expanded metal sheet 56 serves to hold insulation 58 in place up against the underside of the heating enclosure top 47 and between flanges 55 and sides 48. The insulation serves to prevent the exterior of the heating enclosure from getting too hot to touch. A refractory fiber insulation available under the trademark "Cerawool" from the Manville Corporation of Denver, Colo. has been found to provide adequate heat insulation.

FIG. 2 also illustrates a heating screen 60 which is also mounted on flanges 55 of the expanded metal sheet 56 at a location below heating coils 52. Heating screen 60 preferably extends across and beneath the entire underside of the heating enclosure, so as to spread out the heat being generated by the heating coils. Such spreading of the heat results in more even or uniform heating on the perforated support surface 20 of the table. Virtually any available aluminum door screening should provide good results.

Turning now to the means for electrically connecting heating coils 52 to an electric power source, it can be seen in FIG. 2 that the end of heating coil 52 is connected to a nut 62, (preferably a brass nut because of its electrical properties) which is threaded onto the end of a brass bolt (not shown) which extends into electrical box 64. The brass nut and bolt combination is insulated electrically from the expanded metal interior of the heating enclosure by a ceramic washer 66. The end of the brass bolt extending into electrical box 64 is connected directly to one lead of an electrical power source (not shown), as through electrical conduit 67. The other lead of the electrical power source coming into box 64 is connected via conduit 68 around heating enclosure 12 to the other end of the heating coil 52 which, as best illustrated in FIG. 1. Attachment is the same as depicted in FIG. 2. Accordingly, the circuit is complete and when the electrical source is activated heating will occur.

While, as depicted, the heating coils extend from one side of the heating enclosure to the other, each heating element could just as well be configured to form a loop within the heating enclosure. With this sort of arrangement the ends of each heating coil could be electrically wired in a single box 64 which would obviate the need for another box 64 on the opposite side of the heating enclosure.

Also depicted in FIGS. 1 and 2 is a removable, angular heat shield 70 having heat insulated handles 72. The shield is preferably made from aluminum because of aluminum's lightweight. The shield is provided with a pair of mounting pins 74 which enable the shield to be easily mounted on the heating enclosure by inserting the pair of pins into the pair of pin holders 76 which are preferably welded to the sidewalls 48 of the heating enclosure. As its name implies, the heat shield provides the operator with an additional layer of heat insulation. Accordingly, an operator attempting to move heating enclosure 12 by properly grabbing insulated handles 72 has virtually no chance of getting burned. While heat shield 70 is illustrated as being removable, it could just as well be permanently fixed or bolted to the heating enclosure. Removability, however, enhances the system's portability.

In accordance with an embodiment of the method of the present invention, an operator desiring to resurface a worn or discolored building panel with a sheet of air impervious material first places the building panel, worn decorative side up, on the perforated support surface 20 of vacuum table 10. The building panel can be located almost anywhere on the perforated support surface as long as there are at least one or two rows of exposed perforations surrounding all side edges of the building panel. It is preferable to have a couple of rows of exposed perforations extending beyond the side edges of the building panels since such facilitates the drawing of a good vacuum, which will be discussed in more detail below.

As the building panel is being placed on the table, another operator or workperson is preferably applying adhesive to one side of air impervious sheet 26, made of any suitable material, such as polyvinyl chloride. Spraying is the preferred way of applying adhesive to the sheet because of the speed with which it can be applied. The type of adhesive will depend on the type of materials being bonded together. Water base adhesive such as adhesive number 40-0158 available from The National Starch and Chemical Company of Bridgewater, N.J. has been found to provide a good bond between the polyvinyl chloride sheet and standard acoustical ceiling panels.

After the building panel has been properly positioned on the perforated support surface of the vacuum table and one surface of the sheet has been sprayed with an adhesive, the operator places the sheet (coated side facing down) over both the surface of the building panel and all exposed perforations in the perforated support surface. Accordingly, all perforations should be covered by either sheet 26 or the building panel's backside surface. It is important that all perforations be covered for purposes of drawing as strong a vacuum as possible. The process will still work if a few of the perforations are left uncovered; however, the vacuum will not be as strong as it could have been, had all perforations had been covered. The details of how the vacuum is drawn will be discussed shortly.

Figure 3:
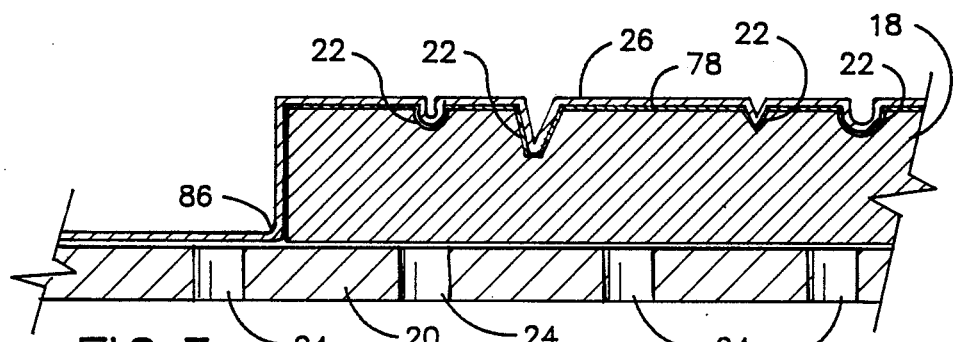
FIG. 3 is a further enlarged cross sectional, fragmentary, view of the building panel illustrated in FIG. 2 after having been subjected to the vacuum drawing step of the present invention wherein the sheet assumes texture or contour of the decorative surface of the old building panel.

After the adhesive coated sheet has been placed over the building panel and the exposed perforations in the perforated support surface as described above, vacuum means 36 is activated which causes sheet 26 to assume the contour of the building panel's decorative surface as depicted in FIG. 3. It can be seen in the cross sectional view of FIG. 3 that sheet 26 has substantially assumed the contour of the building panel's surface including those of its deep fissures 22 with adhesive 78 therebetween. This can be compared with the view provided in FIG. 2 which depicts the sheet having been placed on the building panel but prior to the drawing of a vacuum. It can be seen in FIG. 2 that while sheet 26 is resting on the decorative surface of building panel 18 it has not assumed or conformed to the contour of the surface.

This invention provides such exceptional surface contour assumption for two reasons. When vacuum means 36 is activated, a vacuum, at least a partial vacuum, is established between the underside surface of sheet 26 and the surface of perforated support surface 20. A partial vacuum is also established within the voids of the building panel if it is air permeable. Once the vacuum is drawn, ambient air pressure is apparently strong enough to force sheet 26 down into fissures 22 of the building panel's surface.

The excellent surface contour assumption of the present invention is provided or at least enhanced by leaving the edge (i.e. edge 80) of sheet 26 unrestrained so that it can be drawn up when the vacuum is applied (See FIG. 2). Leaving edge 80 unrestrained also provides another advantage in that it enables an operator to lightly grab and pull on the edge for purposes of removing any creases or wrinkles that might have occurred in the sheet either during the step of placing the sheet on the building panel or during the vacuum drawing step.

The next step of the process is directed to curing the adhesive and it may or may not be necessary depending on the type of adhesive having been applied. For example, pressure sensitive adhesives may cure instantly as soon as the vacuum is drawn. Water based adhesives such as that previously described for bonding polyvinyl chloride sheet and standard acoustical ceiling panels may take some time to cure. To expedite such curing it is often desirable to apply heat. Accordingly, in a preferred embodiment of the present invention, an operator after having smoothed out any wrinkles in the sheet moves heating enclosure 12 on track 16 over the respective work station so that the heating enclosure is positioned directly above the building panel. All heating elements 52 are then activated for a predetermined period of time which is sufficient to cure the adhesive. It should be pointed out that the vacuum on the building panel is preferably maintained during the entire heating process. In the particular embodiment illustrated, it has been found that heating periods of approximately twenty-five seconds are sufficient to substantially cure the water based adhesive when the sheet is polyvinyl chloride sheet having a thickness of about 3.5 mils. Quite obviously longer heating periods will be required with thicker sheets. In addition, with polyvinyl chloride sheets it has been found that it is desirable to heat the sheet until its temperature reaches the range of more than 165° F. to less than about 300° F. A temperature of approximately 185° F. to 190° F. has been found to be most optimum. At this temperature the sheet softens slightly which causes the sheet to further conform to the contour o texture of the building panel's surface. Accordingly, a heating polyvinyl chloride sheet as well as sheets made of other materials to its softening temperature further enhances the sheet's ability to assume surface contours.

After heating the now resurfaced building panel for the specified period of time, power to the heater and vacuum is shut off. The operator then moves the heating enclosure away from his work station (e.g., work station A) to the intermediate location located between the two work stations. As previously mentioned, a safe operator will move heating enclosure 12 by grabbing handles 72 located on heat shield 70. The heater then can be used by an operator working at work station B.

Figure 4:
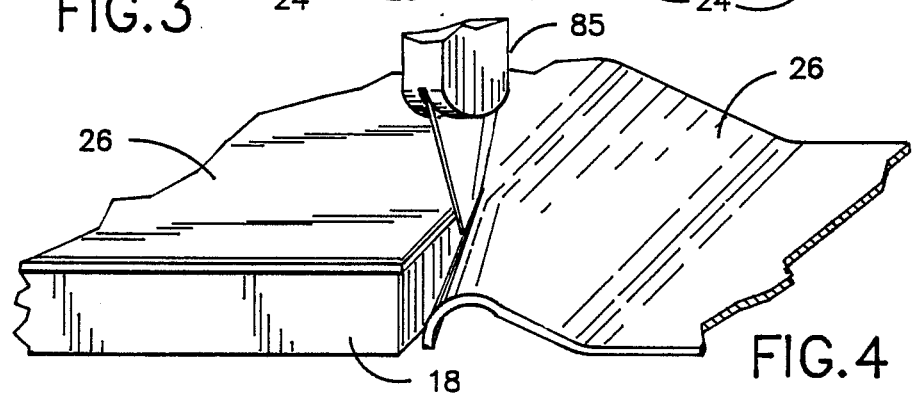
FIG. 4 is a fragmentary perspective view of the trimming step of the present invention wherein the excess, unused sheet is trimmed away from the corner of a resurfaced building panel with a utility knife.

After the heating step has been completed and the heating enclosure has been moved to the intermediate location, the operator picks up a utility knife, such as utility knife 85 illustrated in FIG. 4 and cuts the sheet around the side edges of the building panel to remove the excess sheet as depicted in FIG. 4. The operation is now complete and the now resurfaced building panel is ready for reinstallation or, if desired, the backside of the building panel can be resurfaced at this point. In fact, the entire building panel can be encapsulated if desired.

This can be accomplished by cutting the excess sheet away from the side edge of the building panel at point 86 as indicted in FIG. 3, instead of along the side edge of the building panel as depicted in FIG. 4.

Based on the foregoing description a number of significant advantages for the present invention are readily apparent. A method and apparatus are provided for the on-site refinishing of worn, faded or discolored panels, at a fraction of the cost of replacing the panels with new ones. The method can be performed rapidly thereby minimizing disruption of the work place. In addition, the present invention provides a novel, resurfaced building panel having a new surface which closely assumes or conforms to the contour of the old panel's decorative surface The novel panel is also as durable or even more durable than the original panel, and in fact may even be washed.

The invention has been described in detail with particular reference to a preferred embodiment thereof, but it will be understood that variations and modifications can be effected within the spirit and scope of the invention.

I claim:

1. A method of refinishing a building panel, such as a ceiling panel or tile and the like, having a worn or discolored decorative front surface, a back surface and side edges forming a periphery, said method comprising the steps of:

placing the building panel on a vacuum support surface having a plurality of perforations through which air can be drawn to form a partial vacuum, said building panel being placed so that its back surface is in contact with the perforated support surface and its decorative surface is exposed, said building panel being positioned on the perforated support surface so that its periphery is surrounded by exposed uncovered perforations;

applying adhesive to one of the decorative surfaces of the building panel and a side of an air impervious sheet;

placing the sheet over the decorative surface of the building panel with the adhesive therebetween, which sheet has a peripheral edge extending over the exposed perforations in the vacuum support surface around the periphery of the panel to form a vacuum chamber;

leaving the peripheral edge of the sheet completely unrestrained; and drawing a partial vacuum via the perforations in the vacuum chamber formed between the sheet and the perforated support surface ;sufficient to hold the unrestrained peripheral edge of the sheet in sealing engagement with the support surface to create a partial vacuum across the entire decorative surface of the building panel which enables ambient air pressure to force or collapse the sheet tightly against the decorative surface and allows the unrestrained peripheral edge to be drawn up so that the sheet substantially assumes the contour or texture of the decorative surface and is adhered thereto by the adhesive.

2. A method, as claimed in claim 1, including the further step of:

applying heat to the building panel as the sheet is being pulled against the decorative surface to cure or dry the adhesive.

3. A method, as claimed in claim 2, including the further steps of:

relieving the vacuum after the sheet adheres to the decorative surface of the building panel; and trimming the sheet around the side edges of the panel after the adhesive has cured.

4. A method, as claimed in claim 1, wherein:

the building panel is air permeable.

5. A method, as claimed in claim 1, including the further step of:

lightly pulling on the unrestrained edge of the sheet to remove any creases or wrinkles that may have formed in the sheet.

* * * * *

UNITED STATES PATENT AND TRADEMARK OFFICE
CERTIFICATE OF CORRECTION

PATENT NO. : 4,894,102

DATED : January 16, 1990

INVENTOR(S) : Kenneth F. Halls

It is certified that error appears in the above-identified patent and that said Letters Patent is hereby corrected as shown below:

Title page, Inventors section, delete "Donald W. Harrison, Golden, Colo."

Signed and Sealed this

Fourth Day of December, 1990

Attest:

HARRY F. MANBECK, JR.

*Attesting Officer*  *Commissioner of Patents and Trademarks*